(12) United States Patent
Aust et al.

(10) Patent No.: US 9,009,160 B2
(45) Date of Patent: Apr. 14, 2015

(54) INFORMATION CLASSIFICATION SYSTEM (75) Inventors: Stefan Aust, Tokyo (JP); Akira Matsumoto, Tokyo (JP); Tetsuya Ito, Tokyo (JP); Koichi Yoshimura, Tokyo (JP); Soshi Kuroshima, Hokkaido (JP)

(73) Assignee: NEC Communication Systems, Ltd., Tokyo (JP)

( * ) Notice: Subject to any disclaimer, the term of this patent is extended or adjusted under 35 U.S.C. 154(b) by 63 days.

(21) Appl. No.: 13/702,022

(22) PCT Filed: Jun. 15, 2011

(86) PCT No.: PCT/JP2011/003395
§ 371 (c)(1),
(2), (4) Date: Dec. 4, 2012

(87) PCT Pub. No.: WO2011/161900
PCT Pub. Date: Dec. 29, 2011

(65) Prior Publication Data
US 2013/0091137 A1    Apr. 11, 2013

(30) Foreign Application Priority Data
Jun. 25, 2010  (JP) .................................. 2010-144622

(51) Int. Cl.
G06F 17/30  (2006.01)
(52) U.S. Cl.
CPC ................................ G06F 17/30705 (2013.01)

(58) Field of Classification Search
CPC .................................................. G06F 17/30705
USPC ......... 707/690, 713, 715, 737, 738, 754, 755, 707/758, 767, 830
See application file for complete search history.

(56) References Cited

U.S. PATENT DOCUMENTS

| 8,082,279 | B2* | 12/2011 | Weare ........................... 707/804 |
| 8,180,717 | B2* | 5/2012 | King et al. ...................... 706/45 |
| 8,185,544 | B2* | 5/2012 | Oztekin et al. ................ 707/768 |
| 2004/0234120 | A1 | 11/2004 | Honda et al. |
| 2010/0082697 | A1* | 4/2010 | Gupta et al. .................. 707/802 |
| 2010/0174686 | A1* | 7/2010 | Acharya et al. ............... 707/690 |
| 2010/0241639 | A1* | 9/2010 | Kifer et al. .................... 707/754 |

FOREIGN PATENT DOCUMENTS

| JP | 2003-016078 | 1/2003 |
| JP | 2004-295879 | 10/2004 |
| JP | 2008-097351 | 4/2008 |

OTHER PUBLICATIONS

International Search Report, PCT/JP2011/003395, Jul. 19, 2011.
(Continued)

*Primary Examiner* — Greta Robinson
(74) *Attorney, Agent, or Firm* — Young & Thompson (57) ABSTRACT

An information classification system 100 includes: a classified information storing part 101 for storing classified information having already been classified into a certain group and group specification information for specifying the group, in association with each other; and a confidence calculating part 102 for calculating confidence having a value depending on a probability that a group which is specified based on unclassified information as a target to be classified and classified information selected as reference information from among the stored classified information and into which the unclassified information should be classified is a true group.

18 Claims, 6 Drawing Sheets

(56) References Cited

OTHER PUBLICATIONS

Shane Robert Cloude, Eric Pottier, "An Entropy Based Classification Scheme for Land Applications of Polarimetric SAR", IEEE, IEEE Transactions on Geoscience and Remote Sensing, Jan. 1997, vol. 35, No. 1, pp. 68-78.

Ali Taheri, Arvinder Singh, Emmanuel Agu, "Location Fingerprinting on Infrastructure 802.11 Wireless Local Area Networks Location Finterprinting on Infrastructure 802.11 Wireless Local Area Network,", IEEE 29th Annual IEEE International Conference on Local Computer Networks (LCN'04), 2004, pp. 676-683.

\* cited by examiner

Fig.4

| $JD_{min}$ | $JD_1$ | $JD_2$ | $JD_3$ | $JD_4$ | $e^{-t/a}$ | dc[%] |
|---|---|---|---|---|---|---|
| 0.2 | 0.3 | 0.31 | 0.39 | 0.399 | 0.993215558 | 0.678442021 |
| 0.22 | 0.221 | 0.233 | — | 0.399 | 0.999797639 | 0.020236116 |
| 0.22 | 0.221 | 0.222 | 0.223 | 0.244 | 0.999882674 | 0.011732645 |
| 0.9 | 1.4 | 1.44 | 2.2 | 5 | 0.831108083 | 16.88919175 |
| 1.1 | 1.4 | — | 2.2 | 5 | 0.783089902 | 21.69100978 |
| 1.1 | 1.4 | 1.45 | 2.2 | 5 | 0.861105498 | 13.88945021 |
| 9 | 10 | 11 | 12 | 13 | 0.013299884 | 98.67001165 |
| 9 | 11 | 15 | 16 | 30 | 2.75364E-05 | 99.99724636 |
| 9 | 11 | 15 | 16 | 40 | 2.27735E-05 | 99.9977265 |
| 1 | 1.5 | 2.2 | — | — | 0.778800783 | 22.11992169 |

INFORMATION CLASSIFICATION SYSTEM

TECHNICAL FIELD

The present invention relates to an information classification system configured to classify information.

BACKGROUND ART

An information classification system that classifies information is known. For example, an information classification system disclosed in Non-Patent Document 1 classifies information based on entropy (the amount of information).

Further, an information classification system disclosed in Non-Patent Document 2 stores classified information already classified in a certain group and group specification information for specifying the group in association with each other. With respect to each of group specification information different from each other among the stored group specification information, the information classification system selects one of classified information stored in association with the group specification information, as reference information. A process by which the information classification system selects reference information is also called offline phase.

The information classification system acquires unclassified information, which is the target of classification. Based on the acquired unclassified information and the selected reference information, the information classification system specifies a group into which the unclassified information should be classified. A process by which the information classification system classifies unclassified information is also called online phase.

[Non-Patent Document 1] Shane Robert Cloude, Eric Pottier, "An Entropy Based Classification Scheme for Land Applications of Polarimetric SAR," IEEE, IEEE TRANSACTIONS ON GEOSCIENCE AND REMOTE SENSING, January 1997, Volume 35, No. 1, pp. 68-78

[Non-Patent Document 2] Ali Taheri, Arvinder Singh, Emmanuel Agu, "Location Fingerprinting on Infrastructure 802.11 Wireless Local Area Networks Location Fingerprinting on Infrastructure 802.11 Wireless Local Area Network," IEEE, 29th Annual IEEE International Conference on Local Computer Networks (LCN'04), 2004, pp 676-683

In the information classification system described above, it is impossible to acquire a value depending on a probability that a group specified as a group into which unclassified information should be classified is a true (correct) group. Therefore, the information classification system described above has a problem that it is impossible to execute a different process in accordance with the probability.

SUMMARY

Accordingly, an object of the present invention is to provide an information classification system capable of solving the aforementioned problem, "it is impossible to execute a different process in accordance with a probability that a group specified as a group into which unclassified information should be classified is a true group."

In order to achieve the object, an information classification system as an exemplary embodiment of the present invention includes:

a classified information storing means for storing classified information having already been classified into a certain group and group specification information for specifying the group, in association with each other; and a confidence calculating means for calculating confidence having a value depending on a probability that a group which is specified based on unclassified information as a target to be classified and classified information selected as reference information from among the stored classified information and into which the unclassified information should be classified is a true group.

Further, an information classification method as another exemplary embodiment of the present invention includes calculating confidence having a value depending on a probability that a group into which unclassified information as a target to be classified should be classified is a true group, the group being specified based on the unclassified information and based on classified information selected as reference information from among classified information stored in a storage device for storing classified information having already been classified into a certain group and group specification information for specifying the group in association with each other.

Further, an information classification device as another exemplary embodiment of the present invention includes:

a classified information storing means for storing classified information having already been classified into a certain group and group specification information for specifying the group, in association with each other; and a confidence calculating means for calculating confidence having a value depending on a probability that a group which is specified based on unclassified information as a target to be classified and classified information selected as reference information from among the stored classified information and into which the unclassified information should be classified is a true group.

Further, an information classification program as another exemplary embodiment of the present invention is a program which includes instructions for causing an information processing device to realize a confidence calculating means for calculating confidence having a value depending on a probability that a group into which unclassified information as a target to be classified should be classified is a true group, the group being specified based on the unclassified information and based on classified information selected as reference information from among classified information stored in a storage device for storing classified information having already been classified into a certain group and group specification information for specifying the group in association with each other.

With the configurations described above, the present invention can execute a different process in accordance with a probability that a group specified as a group into which unclassified information should be classified is a true group.

EXEMPLARY EMBODIMENTS

Below, the respective exemplary embodiments of an information classification system, an information classification method, an information classification device and an information classification program according to the present invention will be described with reference to FIGS. 1 to 9.

First Exemplary Embodiment

Configuration

Figure 1:
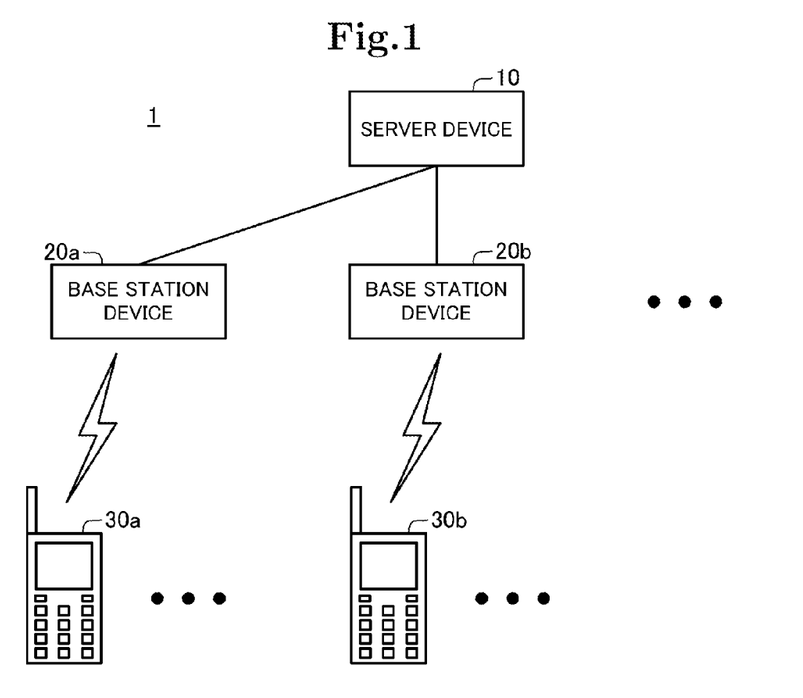
FIG. 1 is a view showing the schematic configuration of a wireless communication system according to a first exemplary embodiment of the present invention.

As shown in FIG. 1, a wireless communication system (an information classification system) 1 according to a first exemplary embodiment includes a server device 10, a plurality of base station devices 20a, 20b, . . . , and a plurality of mobile station devices (communication terminals) 30a, 30b, . . . . The server device 10 is connected so as to be capable of communication with each of the plurality of base station devices 20a, 20b . . . .

The server device 10 is equipped with a Central Processing Unit (CPU) and a storage device (a memory and a Hard Disk Drive (HDD)), which are not shown in the drawings. The server device 10 is configured to realize a function described later by CPU's execution of a program stored in the storage device.

Each of the base station devices 20a, 20b, . . . is a device which is also called an access point, a base unit or a station. Each of the base station devices 20a, 20b, . . . is configured to be capable of performing wireless communication with the mobile station devices 30a, 30b, . . . located within a predetermined region including the base station device. A wireless communication method is, for example, the cognitive wireless method, the cellular method, a method compliant with IEEE802.11, the mesh method, or the like.

Each of the mobile station devices 30a, 30b, . . . is a mobile phone terminal. Each of the mobile station devices 30a, 30b, . . . may be a personal computer, a PHS (Personal Handyphone System), a PDA (Personal Data Assistance, Personal Digital Assistant), a car navigation terminal, a game terminal, or the like.

Each of the mobile station devices 30a, 30b, . . . is equipped with a central processing unit (CPU), a storage device (a memory), an input device (a plurality of buttons, microphones and so on in this exemplary embodiment), and an output device (a display, a speaker, and so on in this exemplary embodiment). Each of the mobile station devices 30a, 30b is configured to realize a function described later by the CPU's execution of a program stored in the storage device.

(Function)

Figure 2:
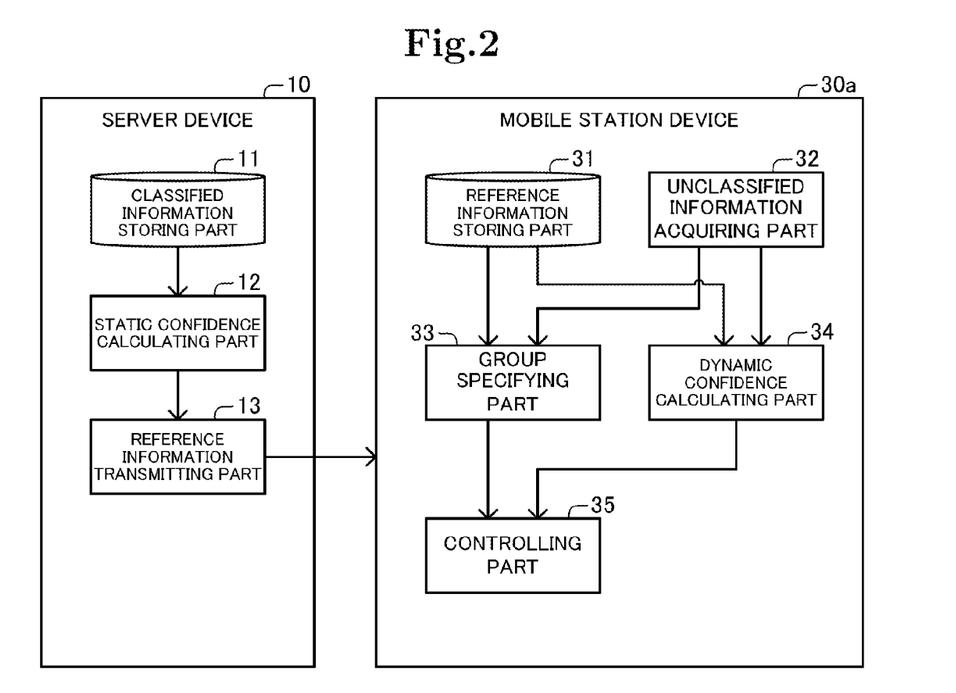
FIG. 2 is a block diagram showing the outline of the function of the wireless communication system according to the first exemplary embodiment of the present invention.

FIG. 2 is a block diagram showing the function of the server device 10 and the function of the mobile station device 30a of the function of the wireless communication system 1 configured as described above. Also, the other mobile station devices 30b, . . . each have a similar function to the function of the mobile station device 30a.

The function of the server device 10 includes a classified information storing part (a classified information storing means) 11, a static confidence calculating part (part of a confidence calculating means) 12, and a reference information transmitting part 13.

The classified information storing part 11 stores classified information having been classified into a certain group and group specification information for specifying the group in association with each other. In this exemplary embodiment, the classified information is communication status information representing the status of wireless communication performed by the mobile station devices 30a, 30b, . . . .

In this exemplary embodiment, the communication status information is time-series data of information representing a measurement value of received signal strength indication (received signal strength indicator). Received signals are wireless signals received by the mobile station device 30a from the base station devices 20a, 20b, . . . .

The communication status information may include time-series data of information representing a measurement value of at least one of throughput, a delay, jitter (variations of a delay), and a signal to noise ratio of a received signal. Moreover, the communication status information can be information representing a measurement value, but may be information for specifying a probability distribution with a measurement value as a random variable.

Further, the group specification information is location specification information for specifying the locations of the mobile station devices 30a, 30b . . . . That is to say, a group specified by the group specification information is a group (a set) configured by the mobile station devices 30a, 30b, . . . arranged in the same location.

The static confidence calculating part 12 extracts all combinations of reference information candidates (reference information candidate combinations), each combination being composed of reference information candidates for each of group specification information different from each other among the group specification information stored in the classified information storing part 11. A reference information candidate for certain group specification information is one of classified information stored in the classified information storing part 11 in association with the group specification information.

The static confidence calculating part 12 executes a static confidence calculation process described below on each of the extracted reference information candidate combinations.

The static confidence calculation process includes a first partial process and a second partial process that are executed on each of all of the classified information stored in the classified information storing part 11. Moreover, the static confidence calculation process includes a third partial process and a fourth partial process that are executed after the first partial process and the second partial process are executed on each of all of the classified information stored in the classified information storing part 11.

The first partial process is a process of, based on classified information (judgment target information) subjected to the first partial process and a reference information candidate combination subjected to the static confidence calculation process, specifying a group (a first group) into which the judgment target information should be classified. This process is similar to a process executed by a group specifying part 33 described later.

The second partial process is a process of judging whether the first group specified in the first partial process matches a group (a second group) specified from group specification information stored in the classified information storing part 11 in association with judgment target information subjected to the second partial process.

The third partial process is a process of selecting reference information based on an equation 1.

$$RD_{bestFit} = \underset{RD_i}{\operatorname{argmax}}\left[\sum_l T_l\bigg|_{RD_i}\right] \quad \text{[Equation 1]}$$

Herein, $RD_i$ denotes an $i^{th}$ reference information candidate combination. Moreover, $RD_{bestFit}$ denotes a reference information combination that is one of the reference information candidate combinations. Moreover, $T_1$ denotes a value that is "1" when the first group and the second group match and, on the other hand, is "0" when they do not match, with respect to $1^{th}$ judgment target information.

That is to say, from among the reference information candidate combinations, the static confidence calculating part 12 selects a reference information candidate combination whose matching number is the maximum, as a reference information combination. Here, the matching number is the number of combinations of judgment target information and a reference information candidate that first group and second group match.

Thus, it is possible to say that the static confidence calculating part 12 acquires the matching number by, with respect to each of a plurality of classified information stored in association with the same group specification information, selecting the classified information as a reference information candidate. Moreover, it is possible to say that, from among a plurality of classified information stored in association with the same group specification information, the static confidence calculating part 12 selects classified information whose matching number having been acquired is the maximum as reference information for the group specification information.

The third partial process may be a process of selecting reference information based on an equation 2.

$$RD_{bestFit} = \underset{RD_i}{\operatorname{argmin}}\left[\sum_l F_l\bigg|_{RD_i}\right] \quad \text{[Equation 2]}$$

Herein, $F_1$ denotes a value that is "0" when the first group and the second group match and, on the other hand, is "1" when they do not match, with respect to $1^{th}$ judgment target information.

The fourth partial process is a process of calculating static confidence with respect to the selected reference information combination based on an equation 3.

$$SC = \frac{\sum_l T_l\big|_{RD_{bestFit}}}{\sum_l T_l\big|_{RD_{bestFit}} + \sum_l F_l\big|_{RD_{bestFit}}} \quad \text{[Equation 3]}$$

Herein, SC denotes static confidence as one kind of confidence. Moreover, confidence is a parameter having a value depending on a probability that a group, which is specified based on unclassified information described later and the classified information selected as the reference information from among the classified information stored in the classified information storing part 11 and into which the unclassified information should be classified, is a true group. The unclassified information is information to be classified. In this exemplary embodiment, the unclassified information is communication status information representing the statuses of wireless communication actually executed by the mobile station devices 30a, 30b, . . . .

In other words, it is possible to say that the static confidence calculating part 12 calculates static confidence based on the matching number calculated with respect to the selected reference information combination. Moreover, it is possible to say that the static confidence calculating part 12 calculates static confidence having a value that becomes larger as the ratio of the matching number to the number of the classified information stored in the classified information storing part 11 becomes higher.

The static confidence calculating part 12 may be configured to, in a case that calculated static confidence is lower than a preset threshold, reselect a different reference information candidate combination from the reference information candidate combination having been selected as the reference information combination, as a reference information combination.

The reference information transmitting part 13 transmits the reference information combination selected by the static confidence calculating part 12 and the group specification information associated with each of reference information included in the reference information combination to the respective mobile station devices 30a, 30b, . . . .

The function of the mobile station device 30a includes a reference information storing part 31, an unclassified information acquiring part (an unclassified information acquiring means) 32, a group specifying part (a group specifying means) 33, a dynamic confidence calculating part (part of a confidence calculating means) 34, and a controlling part 35.

The reference information storing part 31 stores the reference information combination and group specification information that are received by the mobile station device 30a from the server device 10.

The unclassified information acquiring part 32 acquires communication status information as unclassified information. In this exemplary embodiment, the unclassified information acquiring part 32 measures the strength of a received signal every time a preset measurement period passes, generates communication status information based on the measured strength of the received signal, and acquires the generated communication status information as unclassified information.

Based on the unclassified information acquired by the unclassified information acquiring part 32 and the reference information combination and group specification information that are stored in the reference information storing part 31, the group specifying part 33 specifies a group into which the unclassified information should be classified. As described above, in this exemplary embodiment, the group specification information is location specification information for specifying the locations of the mobile station devices 30a, 30b, . . . . Therefore, it is also possible to say that the group specifying part 33 specifies the location of the mobile station device 30a.

To be specific, the group specifying part 33, with respect to each of the reference information included in the reference information combination, calculates a divergence representing a degree that the reference information and the unclassified information are different from each other. In this exemplary embodiment, the group specifying part 33 uses Jeffrey divergence as the divergence.

Jeffrey divergence JD (p, q) is defined by an equation 4 and an equation 5. Here, $p_i$ denotes $i^{th}$ data included in reference information p, and $q_i$ denotes $i^{th}$ data included in unclassified information.

$$JD(p, q) = \sum_i \left[ p_i \log\left(\frac{p_i}{m_i}\right) + q_i \log\left(\frac{q_i}{m_i}\right) \right] \quad \text{[Equation 4]}$$

$$m_i = \frac{p_i + q_i}{2} \quad \text{[Equation 5]}$$

The group specifying part 33 may use Kullback-Leibler divergence (KL divergence) or Jensen-Shannon divergence, as the divergence.

The group specifying part 33 specifies reference information that the calculated divergence is the minimum, as optimum reference information. The group specifying part 33 specifies a group specified by group specification information stored in association with the specified optimum reference information, as a group into which the unclassified information should be classified.

The dynamic confidence calculating part 34 calculates a divergence $JD_i$ with respect to each of reference information included in a reference information combination as the group specifying part 33 does. Here, $JD_i$ denotes a divergence calculated with respect to $i^{th}$ reference information. The dynamic confidence calculating part 34 calculates dynamic confidence dc based on the calculated divergence $JD_i$, an equation 6 and an equation 7.

$$dc = 100 \cdot (1 - e^{-\alpha/a}) \quad \text{[Equation 6]}$$

$$a = \sum_{i=1}^{n} \frac{1}{|1 - JD_i / JD_{min}|} \quad \text{[Equation 7]}$$

Herein, $JD_{min}$ denotes a divergence calculated with respect to optimum reference information (i.e., the minimum divergence that is the minimum value of the calculated divergence $JD_i$). Moreover, a denotes a regulation parameter set in advance. Moreover, n denotes the number of reference information included in a reference information combination.

Thus, it is possible to say that the dynamic confidence calculating part 34 calculates dynamic confidence having a value that becomes smaller as a difference between the minimum divergence $JD_{min}$, as the smallest value of the calculated divergence $JD_i$ and a proximate divergence as the second smallest value next to the minimum divergence $JD_{min}$, becomes smaller.

Figure 3:
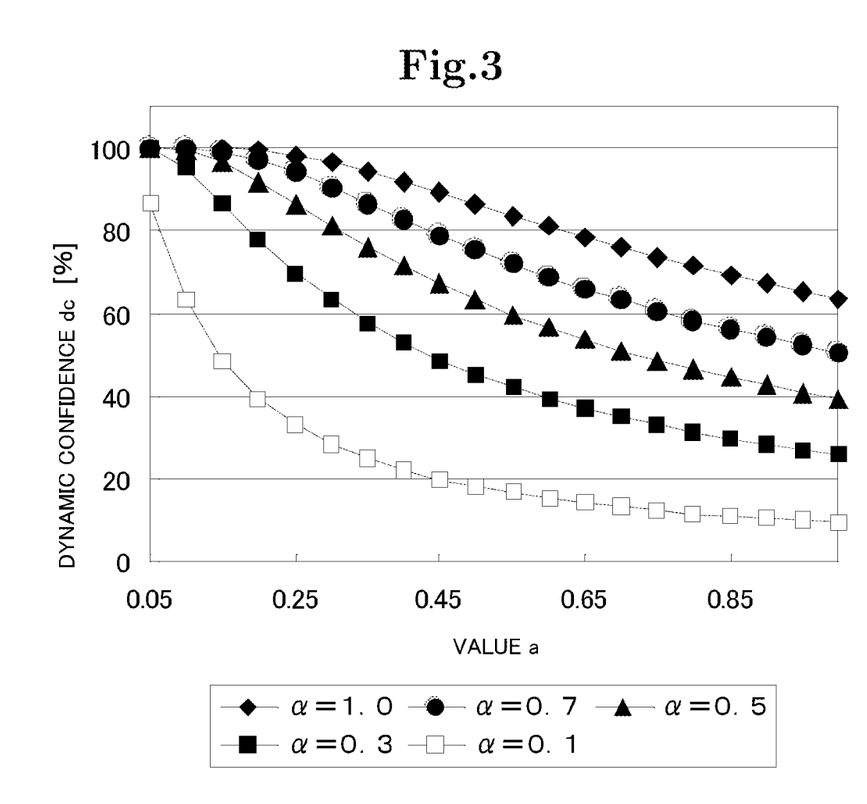
FIG. 3 is a graph showing a relation between dynamic confidence dc and a value a defined by an equation 7 with respect to each of a plurality of different regulation parameters α.

FIG. 3 is a graph showing a relation between dynamic confidence dc and a value a defined by the equation 7 with respect to each of a plurality of different regulation parameters α. It is apparent that the larger the value of the regulation parameter α becomes, the higher the dynamic confidence dc becomes. Thus, by using the regulation parameter α, it is possible to change (regulate) the dynamic confidence dc in a scalable manner.

Figure 4:
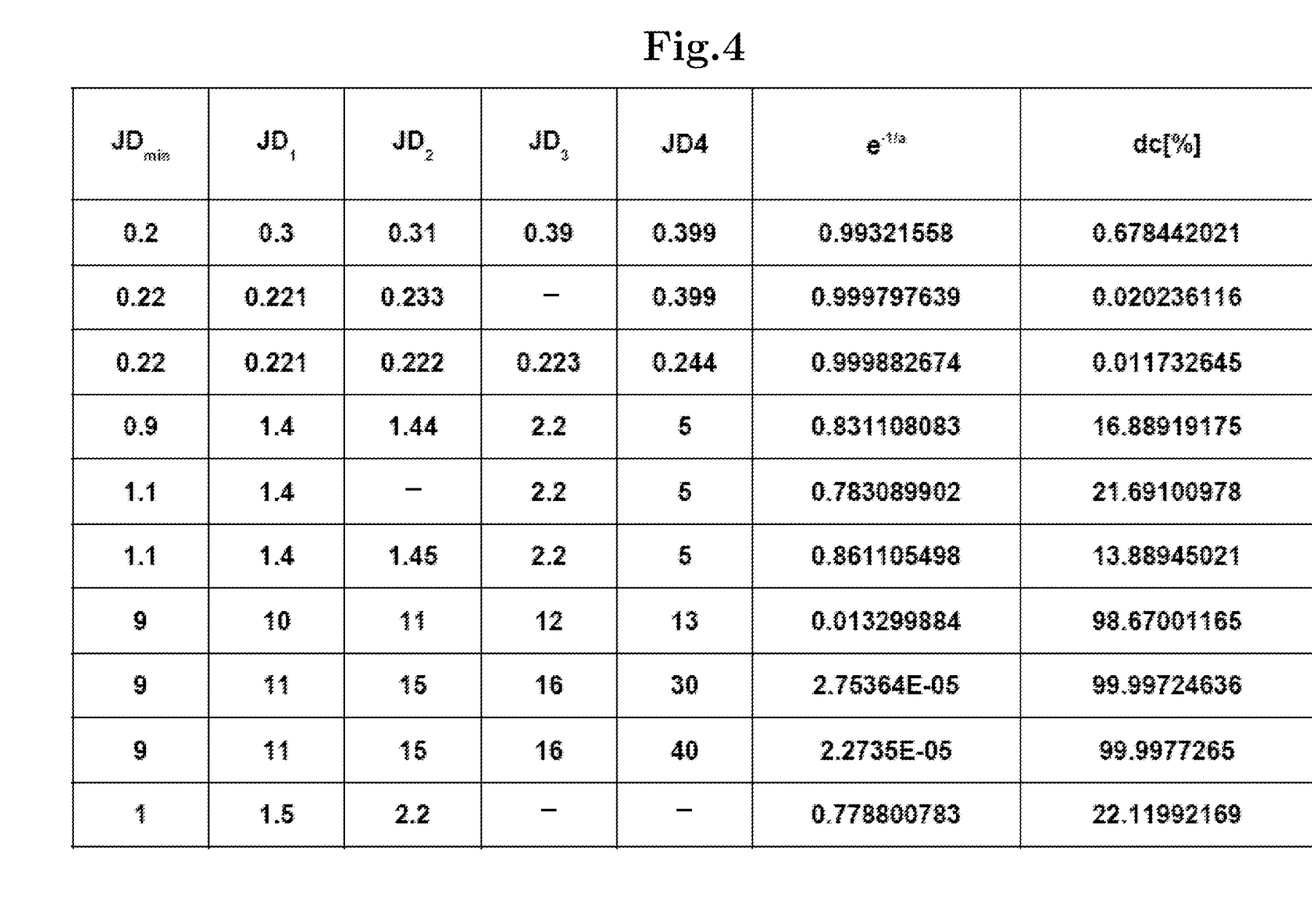
FIG. 4 is a table showing an example of calculation of dynamic confidence.

Further, FIG. 4 is a table showing a calculation example of dynamic confidence. This table includes ten calculation examples of dynamic confidence. Moreover, this table includes, with respect to each of the dynamic confidence, the minimum divergence $JD_{min}$, calculated for optimum reference information and divergences $JD_1$ to $JD_4$ calculated for the other reference information.

Thus, the dynamic confidence dc becomes smaller (closer to 0%) as a difference between the minimum divergence $JD_{min}$ and the other divergences $JD_1$ to $JD_4$ (particularly, a proximate divergence as the second smallest value next to the minimum divergence $JD_{min}$, among the other divergences $JD_1$ to $JD_4$) becomes smaller. On the contrary, the dynamic confidence dc becomes larger (closer to 100%) as a difference between the minimum divergence $JD_{min}$, and the other divergences $JD_1$ to $JD_4$ (particularly, a proximate divergence as the second smallest value next to the minimum divergence $JD_{min}$, among the other divergences $JD_1$ to $JD_4$) becomes larger.

The controlling part 35 controls the mobile station device 30a based on the group specified by the group specifying part 33 and the dynamic confidence calculated by the dynamic confidence calculating part 34.

In this exemplary embodiment, the controlling part 35 controls the mobile station device 30a based on control information previously set in association with the specified group. For example, the control information includes at least one of information representing a communication method, a communication control parameter used at the time of performing communication, a handover control parameter used at the time of performing handover, and an output control parameter for controlling the output device (e.g., the output level of the speaker, the luminance of the display, and the like).

Further, the controlling part 35 does not execute control based on the specified group when the calculated dynamic confidence is smaller than a preset threshold. That is to say, in such a case, the controlling part 35 discards the specified group.

(Operation)

Next, the operation of the above wireless communication system will be described. At first, the operation of the server device 10 will be described.

Figure 5:
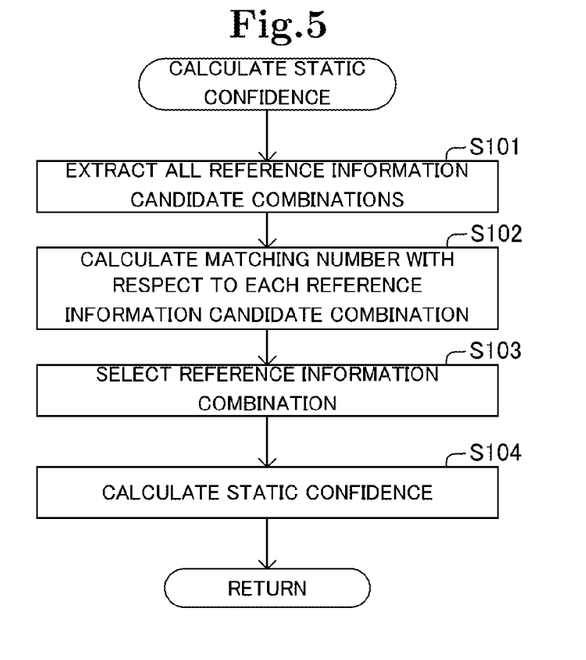
FIG. 5 is a flowchart showing a static confidence calculation program executed for calculation of static confidence by a server device according to the first exemplary embodiment of the present invention.

The server device 10 is configured to execute a static confidence calculation program shown by a flowchart in FIG. 5. In this exemplary embodiment, the server device 10 executes the static confidence calculation program in a case that information stored in the classified information storing part 11 is changed. The server device 10 may be configured to execute the static confidence calculation program every time a preset execution period passes.

At first, the server device 10 extracts all reference information candidate combinations each composed of reference information candidates for each of group specification information different from each other among the group specification information stored in the classified information storing part 11 (step S101).

Next, with respect to each of the extracted reference information candidate combinations, for each of classified information stored in the classified information storing part 11, based on the classified information (judgment target information) and the reference information candidate group, the server device 10 specifies a group (a first group) into which the judgment target information should be classified, and calculates the matching number based on the result of the specification (step S102).

As described above, the matching number is the number of judgment target information that a group (a first group) specified, based on classified information (judgment target information) and a reference information candidate group, as a group into which the judgment target information should be classified matches a group (a second group) specified by group specification information stored in the classified information storing part 11 in association with the judgment target information.

Then, the server device 10 selects a reference information candidate combination whose matching number having been calculated is the maximum, as a reference information combination from among the extracted reference information candidate groups (step S103).

Next, the server device 10 calculates static confidence SC for the selected reference information combination based on the equation 3 (step S104).

After that, the server device 10 transmits the selected reference information combination and group specification information associated with each of reference information included in the reference information combination to the respective mobile station devices 30a, 30b, . . . .

Figure 6:
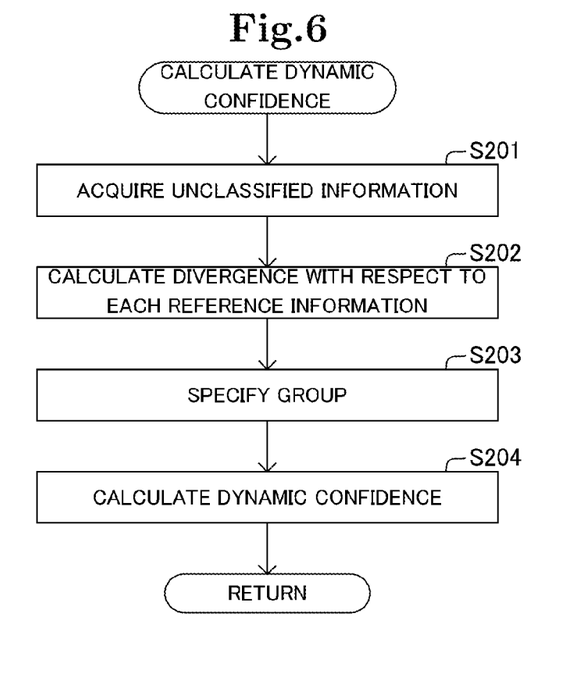
FIG. 6 is a flowchart showing a dynamic confidence calculation program executed for calculation of dynamic confidence by a mobile station device according to the first exemplary embodiment of the present invention.

Next, the operation of the mobile station device 30a will be described. The other mobile station devices 30b, . . . also operate as the mobile station device 30a does.

At first, the mobile station device 30a receives the reference information combination and the group specification information from the server device 10, and causes the storage device to store the received reference information combination and group specification information.

Further, the mobile station device 30a is configured to execute a dynamic confidence calculation program shown by a flowchart in FIG. 6. At first, the mobile station device 30a acquires unclassified information (step S201). Next, the mobile station device 30a calculates the divergence with respect to each of reference information included in the stored reference information combination (step S202).

Then, the mobile station device 30a specifies reference information that the calculated divergence is the minimum as optimum reference information, and specifies a group specified by group specification information stored in association with the specified optimum reference information as a group into which the unclassified information should be classified (step S203).

Next, the mobile station device 30a calculates the dynamic confidence dc based on the calculated divergence, the equation 6 and the equation 7 (step S204).

After that, the mobile station device 30a controls itself based on the specified group and the calculated dynamic confidence dc.

As described above, the wireless communication system 1 according to the first exemplary embodiment of the present invention calculates confidence (static confidence and dynamic confidence) having a value depending on a probability that a group specified as a group into which unclassified information should be classified based on the unclassified information and reference information is a true group. Consequently, the wireless communication system 1 can execute a different process in accordance with the probability.

For example, the wireless communication system 1 can reselect reference information in a case that the confidence is lower than a predetermined threshold. Moreover, the wireless communication system 1 can discard the specified group in a case that the confidence is lower than the predetermined threshold.

Further, the wireless communication system 1 according to the first exemplary embodiment calculates the static confidence based on the matching number.

The matching number is a value on which a probability that a group specified as a group where unclassified information should be classified based on the unclassified information and reference information is a true group is reflected. Therefore, according to the above configuration, it is possible to calculate the static confidence with high accuracy.

In addition, the wireless communication system 1 according to the first exemplary embodiment calculates static confidence having a value that becomes larger as the ratio of the matching number to the number of stored classified information becomes larger.

According to this, it is possible to calculate the static confidence with higher accuracy.

Further, the wireless communication system 1 according to the first exemplary embodiment selects classified information that the matching number is the maximum, as reference information.

According to this, it is possible to select appropriate reference information. As a result, it is possible to increase a probability that a group specified, based on unclassified information and reference information, as a group into which the unclassified information should be classified is a true group.

In addition, the wireless communication system 1 according to the first exemplary embodiment calculates a divergence representing a degree that reference information and unclassified information are different from each other, and calculates the dynamic confidence based on the calculated divergence.

The divergence calculated with respect to each of group specification information is a value on which a probability that a group specified, based on unclassified information and reference information, as a group that the unclassified information should be classified is a true group is reflected. Therefore, according to the above configuration, it is possible to calculate the dynamic confidence with high accuracy.

Further, the wireless communication system 1 according to the first exemplary embodiment calculates the dynamic confidence having a value that becomes smaller as a difference between a minimum divergence as the minimum value of the calculated divergence and a proximate divergence as the second smallest value next to the minimum divergence of the calculated divergence becomes smaller.

According to this, it is possible to calculate the dynamic confidence with high accuracy.

The wireless communication system 1 according to the first exemplary embodiment is configured to calculate the matching number with respect to each of reference information candidate combinations and select a reference information candidate combination that the calculated matching number is the maximum as a reference information combination. The wireless communication system 1 according to a modified example 1 of the first exemplary embodiment may be configured to calculate the static confidence with respect to each of reference information candidate combinations and select a reference information candidate combination that the calculated static confidence is the maximum as a reference information combination.

The wireless communication system 1 according to a modified example 2 of the first exemplary embodiment may be configured to calculate the confidence for each size (data amount), or each range of sizes set in advance, of a packet received by the mobile station device 30a in communication that is the basis of acquisition of unclassified information.

According to this, even when the confidence varies with the size of the packet, it is possible to calculate the confidence with high accuracy.

Further, the wireless communication system 1 according to a modified example 3 of the first exemplary embodiment may be configured to calculate the confidence for each distance, or each range of distances set in advance, between the other side of communication that is the basis of acquisition of unclassified information (in this exemplary embodiment, one of the base station devices 20a, 20b, . . . ) and the own device (the mobile station device 30a).

According to this, even when the confidence varies with the distance from the other side of communication, it is possible to calculate the confidence with high accuracy.

Figure 7:
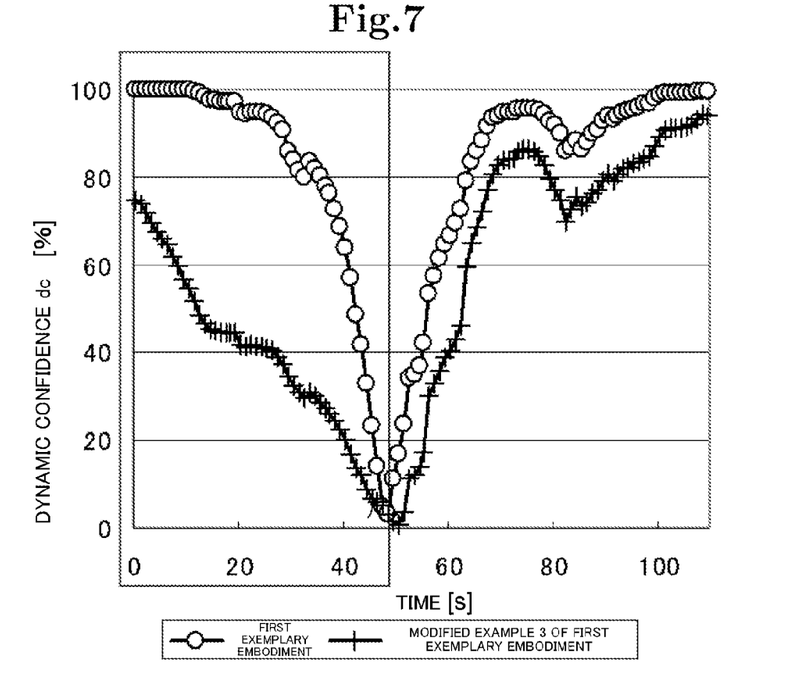
FIG. 7 is a graph showing change of dynamic confidence dc with respect to time.

FIG. 7 is a graph showing change of the dynamic confidence dc with respect to time, calculated in an experiment executed by using the wireless communication system 1. In FIG. 7, a case of using the wireless communication system 1 according to the first exemplary embodiment and a case of using the wireless communication system according to the modified example 3 of the first exemplary embodiment are compared.

In this experiment, at a moment that time was 50 seconds, the location of the mobile station device (i.e., a group to which the mobile station device belongs) changed. Thus, it appears that the value of the dynamic confidence dc changes when the location of the mobile station changes. Moreover, it is apparent that, at a moment earlier than the moment that the location of the mobile station device actually changed, the value of the dynamic confidence dc started to change. For example, it is possible to estimate change of the location of the mobile station by using such a characteristic.

Second Exemplary Embodiment

Next, a wireless communication system according to a second exemplary embodiment of the present invention will be described. The wireless communication system according to the second exemplary embodiment is different from the wireless communication system according to the first exemplary embodiment in that a mobile station device is configured to calculate static confidence and also selects reference information. Therefore, a description will be made below focusing on the different point.

(Function)

Figure 8:
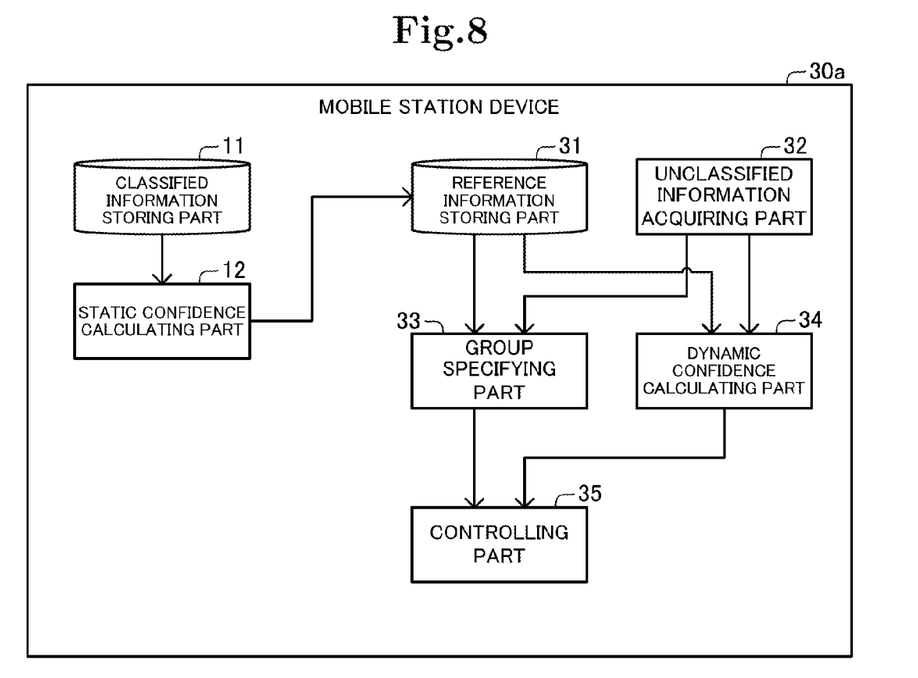
FIG. 8 is a block diagram showing the outline of the function of a wireless communication system according to a second exemplary embodiment of the present invention.

FIG. 8 is a block diagram showing the function of the mobile station device 30a of the function of the wireless communication system 1 according to the second exemplary embodiment. The other mobile station devices 30b, . . . also have similar functions as the function of the mobile station device 30a.

The function of the mobile station device 30a includes a classified information storing part (a classified information storing means) 11, a static confidence calculating part (part of a confidence calculating means) 12, a reference information storing part 31, an unclassified information acquiring part (an unclassified information acquiring means) 32, a group specifying part (a group specifying means) 33, a dynamic confidence calculating part (part of the confidence calculating means) 34, and a controlling part 35. The respective functions have similar functions to the functions denoted by the same reference numerals in the first exemplary embodiment.

The reference information storing part 31 in the second exemplary embodiment stores a reference information combination selected by the dynamic confidence calculating part 12, and group specification information associated with each of reference information included in the reference information combination.

Thus, in the second exemplary embodiment, each of the mobile station devices 30a, 30b, . . . configures an information classification device.

As described above, according to the mobile station devices 30a, 30b, . . . of the second exemplary embodiment of the present invention, it is possible to produce similar actions and effects to those of the wireless communication system 1 of the first exemplary embodiment.

Third Exemplary Embodiment

Figure 9:
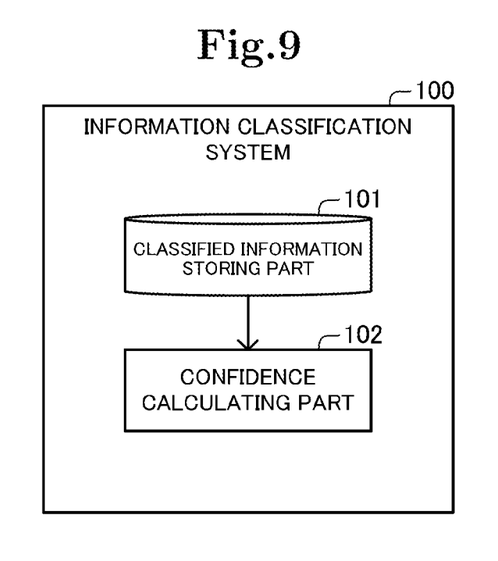
FIG. 9 is a block diagram showing the outline of the function of an information classification system according to a third exemplary embodiment of the present invention.

Next, an information classification system according to a third exemplary embodiment of the present invention will be described with reference to FIG. 9.

An information classification system 100 according to the third exemplary embodiment includes:

a classified information storing part (a classified information storing means) 101 for storing classified information having already been classified into a certain group and group specification information for specifying the group, in association with each other; and a confidence calculating part (a confidence calculating means) 102 for calculating confidence having a value depending on a probability that a group which is specified based on unclassified information as a target to be classified and classified information selected as reference information from among the stored classified information and into which the unclassified information should be classified is a true group.

According to this, the information classification system 100 calculates confidence having a value depending on a probability that a group specified as a group into which unclassified information should be classified based on the unclassified information and reference information is a true group. Consequently, the information classification system 100 can execute a different process in accordance with the probability. For example, the information classification system 100 can reselect reference information in a case that the confidence is lower than a predetermined threshold. Moreover, the information classification system 100 can discard the specified group in a case that the confidence is lower than the predetermined threshold.

Although the present invention has been described above with reference to the exemplary embodiments, the present invention is not limited to the exemplary embodiments described above. The configurations and details of the present invention can be altered in various manners that can be understood by those skilled in the art within the scope of the present invention.

For example, the wireless communication system 1 according to each of the exemplary embodiments described above may be configured so that, in the case of using the cognitive wireless method as the wireless communication method, a cognitive engine selects an optimum frequency and/or communication method based on static confidence. Moreover, the wireless communication system 1 according to each of the exemplary embodiments described above may be configured to determine the timing to specify the locations of the mobile station devices 30a, 30b, . . . based on static confidence.

Further, the wireless communication system 1 according to each of the exemplary embodiments described above may be configured to prepare for execution of handover or switching of a radio channel based on the dynamic confidence.

Further, the information classification system is applied to a wireless communication system in each of the exemplary embodiments described above, but may be applied to an information processing system executing an image recognition process or a speech recognition process.

In a case that the information classification system according to the present invention is applied to an information processing system executing an image recognition process, information to be classified is information representing an image, and respective groups include similar images to each other. Moreover, in a case that the information classification system according to the present invention is applied to an information processing system executing a speech recognition process, information to be classified is information representing a speech, and respective groups include similar speeches to each other.

In each of the exemplary embodiments described above, each function of the radio communication system 1 is realized by execution of a program (software) by the CPU, but may be realized by hardware such as a circuit.

Further, in the respective exemplary embodiments described above, the program is stored in the storage device, but may be stored in a computer-readable recording medium. For example, the recording medium is a portable medium such as a flexible disk, an optical disk, a magneto-optical disk and a semiconductor memory.

Further, as another modified example of each of the exemplary embodiments described above, any combination of the exemplary embodiments and modified examples described above may be employed.

[Supplementary Notes]

The whole or part of the exemplary embodiments disclosed above can be described as, but not limited to, the following supplementary notes.

(Supplementary Note 1)

An information classification system, comprising:

a classified information storing means for storing classified information having already been classified into a certain group and group specification information for specifying the group, in association with each other; and a confidence calculating means for calculating confidence having a value depending on a probability that a group which is specified based on unclassified information as a target to be classified and classified information selected as reference information from among the stored classified information and into which the unclassified information should be classified is a true group.

According to this, the information classification system calculates confidence having a value depending on a probability that a group specified as a group into which unclassified information should be classified based on the unclassified information and reference information is a true group. Consequently, the information classification system can execute a different process in accordance with the probability. For example, the information classification system can reselect reference information in a case that the confidence is lower than a predetermined threshold. Moreover, the information classification system can discard the specified group in a case that the confidence is lower than the predetermined threshold.

(Supplementary Note 2)

The information classification system according to Supplementary Note 1, wherein the confidence calculating means is configured to:

with respect to each classified information of the stored classified information, judge whether a first group and a second group match each other, the first group being a group which is specified based on the each classified information as judgment target information and based on classified information selected as a reference information candidate from among the stored classified information and into which the judgment target information should be classified, and the second group being a group specified based on the group specification information stored in association with the judgment target information; and calculate static confidence as one of the confidence based on a matching number as a number of judgment target information that the first group and the second group match each other.

The matching number is a value on which a probability that a group specified as a group where unclassified information should be classified based on the unclassified information and reference information is a true group is reflected. Therefore, according to the above configuration, it is possible to calculate the static confidence with high accuracy.

(Supplementary Note 3)

The information classification system according to Supplementary Note 2, wherein the confidence calculating means is configured to calculate the static confidence having a value becoming larger as a ratio of the matching number to a number of the stored classified information becomes higher.

According to this, it is possible to calculate the static confidence with higher accuracy.

(Supplementary Note 4)

The information classification system according to Supplementary Note 2 or 3, wherein the confidence calculating means is configured to:

with respect to each classified information of a plurality of classified information stored in association with same group specification information, acquire the matching number by selecting the each classified information as the reference information candidate; and from among the plurality of classified information stored in association with the same group specification information, select classified information that the acquired matching number is maximum as the reference information for the group specification information.

According to this, it is possible to select appropriate reference information. As a result, it is possible to increase a probability that a group into which unclassified information should be classified and which is specified based on the unclassified information and reference information is a true group.

(Supplementary Note 5)

The information classification system according to any of Supplementary Notes 1 to 4, wherein the confidence calculating means is configured to:

with respect to each group specification information of group specification information different from each other among the stored group specification information, calculate a divergence representing a degree of divergence between the reference information selected for the each group specification information and the unclassified information; and calculate dynamic confidence as one of the confidence based on the calculated divergence.

The divergence calculated with respect to each of group specification information is a value on which a probability that a group specified based on the unclassified information and reference information as a group where unclassified information should be classified is a true group is reflected. Therefore, according to the above configuration, it is possible to calculate the dynamic confidence with high accuracy.

(Supplementary Note 6)

The information classification system according to Supplementary Note 5, wherein the confidence calculating means is configured to calculate the dynamic confidence having a value becoming smaller as a difference between a minimum divergence that is a minimum value of the calculated divergence and a proximate divergence that is a second minimum value next to the minimum divergence of the calculated divergence becomes smaller.

According to this, it is possible to calculate the dynamic confidence with high accuracy.

(Supplementary Note 7)

The information classification system according to Supplementary Note 5 or 6, wherein the confidence calculating means is configured to calculate the divergence by using Kullback-Leibler divergence (KL divergence) or Jeffrey divergence.

(Supplementary Note 8)

The information classification system according to any of Supplementary Notes 1 to 7, comprising:

an unclassified information acquiring means for acquiring the unclassified information; and a group specifying means for, based on the acquired unclassified information and the reference information, specifying a group into which the unclassified information should be classified.

(Supplementary Note 9)

The information classification system according to any of Supplementary Notes 1 to 8, wherein:

the classified information is communication status information representing a status of wireless communication having been executed by a communication terminal;

the unclassified information is communication status information representing a status of wireless communication being currently executed by a communication terminal; and the group specification information is location specification information for specifying a location of a communication terminal.

(Supplementary Note 10)

An information classification method, comprising calculating confidence having a value depending on a probability that a group into which unclassified information as a target to be classified should be classified is a true group, the group being specified based on the unclassified information and based on classified information selected as reference information from among classified information stored in a storage device for storing classified information having already been classified into a certain group and group specification information for specifying the group in association with each other.

(Supplementary Note 11)

The information classification method according to Supplementary Note 10, comprising:

with respect to each classified information of the stored classified information, judging whether a first group and a second group match each other, the first group being a group which is specified based on the each classified information as judgment target information and based on classified information selected as a reference information candidate from among the stored classified information and into which the judgment target information should be classified, and the second group being a group specified based on the group specification information stored in association with the judgment target information; and calculating static confidence as one of the confidence based on a matching number as a number of judgment target information that the first group and the second group match each other.

(Supplementary Note 12)

The information classification method according to Supplementary Note 10 or 11, comprising:

with respect to each group specification information of group specification information different from each other among the stored group specification information, calculating a divergence representing a degree of divergence between the reference information selected for the each group specification information and the unclassified information; and calculating dynamic confidence as one of the confidence based on the calculated divergence.

(Supplementary Note 13)

An information classification device, comprising:

a classified information storing means for storing classified information having already been classified into a certain group and group specification information for specifying the group, in association with each other; and a confidence calculating means for calculating confidence having a value depending on a probability that a group which is specified based on unclassified information as a target to be classified and classified information selected as reference information from among the stored classified information and into which the unclassified information should be classified is a true group.

(Supplementary Note 14)

The information classification device according to Supplementary Note 13, wherein the confidence calculating means is configured to:

with respect to each classified information of the stored classified information, judge whether a first group and a second group match each other, the first group being a group which is specified based on the each classified information as judgment target information and based on classified information selected as a reference information candidate from among the stored classified information and into which the judgment target information should be classified, and the second group being a group specified based on the group specification information stored in association with the judgment target information; and calculate static confidence as one of the confidence based on a matching number as a number of judgment target information that the first group and the second group match each other.

(Supplementary Note 15)

The information classification device according to Supplementary Note 13 or 14, wherein the confidence calculating means is configured to:

with respect to each group specification information of group specification information different from each other among the stored group specification information, calculate a divergence representing a degree of divergence between the reference information selected for the each group specification information and the unclassified information; and calculate dynamic confidence as one of the confidence based on the calculated divergence.

(Supplementary Note 16)

An information classification program, comprising instructions for causing an information processing device to realize a confidence calculating means for calculating confidence having a value depending on a probability that a group into which unclassified information as a target to be classified should be classified is a true group, the group being specified based on the unclassified information and based on classified information selected as reference information from among classified information stored in a storage device for storing classified information having already been classified into a certain group and group specification information for specifying the group in association with each other.

(Supplementary Note 17)

The information classification program according to Supplementary Note 16, wherein the confidence calculating means is configured to:

with respect to each classified information of the stored classified information, judge whether a first group and a second group match each other, the first group being a group which is specified based on the each classified information as judgment target information and based on classified information selected as a reference information candidate from among the stored classified information and into which the judgment target information should be classified, and the second group being a group specified based on the group specification information stored in association with the judgment target information; and calculate static confidence as one of the confidence based on a matching number as a number of judgment target information that the first group and the second group match each other.

(Supplementary Note 18)

The information classification program according to Supplementary Note 16 or 17, wherein the confidence calculating means is configured to:

with respect to each group specification information of group specification information different from each other among the stored group specification information, calculate a divergence representing a degree of divergence between the reference information selected for the each group specification information and the unclassified information; and calculate dynamic confidence as one of the confidence based on the calculated divergence.

The present invention is based upon and claims the benefit of priority from Japanese patent application No. 2010-144622, filed on Jun. 25, 2010, the disclosure of which is incorporated herein in its entirety by reference.

INDUSTRIAL APPLICABILITY

The present invention can be applied to an information classification system classifying information, a wireless communication system performing wireless communication, an information processing system executing an image recognition process, an information processing system executing a speech recognition process, and so on.

DESCRIPTION OF REFERENCE NUMERALS 1 wireless communication system (information classification system)
10 server device
11 classified information storing part
12 static confidence calculating part
13 reference information transmitting part
20a, 20b, . . . base station device
30a, 30b, . . . mobile station device
31 reference information storing part
32 unclassified information acquiring part
33 group specifying part
34 dynamic confidence calculating part
35 controlling part
100 information classification system
101 classified information storing part
102 confidence calculating part

The invention claimed is:

1. An information classification system, comprising:
a classified information storing unit for storing classified information having already been classified into a certain group and group specification information for specifying the group, in association with each other; and
a confidence calculating unit for calculating confidence having a value depending on a probability that a group which is specified based on unclassified information as a target to be classified and classified information selected as reference information from among the stored classified information and into which the unclassified information should be classified is a true group,
wherein the confidence calculating unit is configured to:
with respect to each classified information of the stored classified information, judge whether a first group and a second group match each other, the first group being a group which is specified based on the each classified information as judgment target information and based on classified information selected as a reference information candidate from among the stored classified information and into which the judgment target information should be classified, and the second group being a group specified based on the group specification information stored in association with the judgment target information; and calculate static confidence as one of the confidence based on a matching number as a number of judgment target information that the first group and the second group match each other.

2. The information classification system according to claim 1, wherein the confidence calculating unit is configured to calculate the static confidence having a value becoming larger as a ratio of the matching number to a number of the stored classified information becomes higher.

3. The information classification system according to claim 2, wherein the confidence calculating unit is configured to:
with respect to each classified information of a plurality of classified information stored in association with same group specification information, acquire the matching number by selecting the each classified information as the reference information candidate; and
from among the plurality of classified information stored in association with the same group specification information, select classified information that the acquired matching number is maximum as the reference information for the group specification information.

4. The information classification system according to claim 2, wherein the confidence calculating unit is configured to:
with respect to each group specification information of group specification information different from each other among the stored group specification information, calculate a divergence representing a degree of divergence between the reference information selected for the each group specification information and the unclassified information; and
calculate dynamic confidence as one of the confidence based on the calculated divergence.

5. The information classification system according to claim 1, wherein the confidence calculating unit is configured to:
with respect to each classified information of a plurality of classified information stored in association with same group specification information, acquire the matching number by selecting the each classified information as the reference information candidate; and
from among the plurality of classified information stored in association with the same group specification information, select classified information that the acquired matching number is maximum as the reference information for the group specification information.

6. The information classification system according to claim 5, wherein the confidence calculating unit is configured to:
with respect to each group specification information of group specification information different from each other among the stored group specification information, calculate a divergence representing a degree of divergence between the reference information selected for the each group specification information and the unclassified information; and calculate dynamic confidence as one of the confidence based on the calculated divergence.

7. The information classification system according to claim 1, wherein:
the classified information is communication status information representing a status of wireless communication having been executed by a communication terminal;
the unclassified information is communication status information representing a status of wireless communication being currently executed by a communication terminal; and
the group specification information is location specification information for specifying a location of a communication terminal.

8. The information classification system according to claim 1, wherein the confidence calculating unit is configured to:
with respect to each group specification information of group specification information different from each other among the stored group specification information, calculate a divergence representing a degree of divergence between the reference information selected for the each group specification information and the unclassified information; and
calculate dynamic confidence as one of the confidence based on the calculated divergence.

9. An information classification system, comprising:
a classified information storing unit for storing classified information having already been classified into a certain group and group specification information for specifying the group, in association with each other; and
a confidence calculating unit for calculating confidence having a value depending on a probability that a group which is specified based on unclassified information as a target to be classified and classified information selected as reference information from among the stored classified information and into which the unclassified information should be classified is a true group,
wherein the confidence calculating unit is configured to:
with respect to each group specification information of group specification information different from each other among the stored group specification information, calculate a divergence representing a degree of divergence between the reference information selected for the each group specification information and the unclassified information; and
calculate dynamic confidence as one of the confidence based on the calculated divergence.

10. The information classification system according to claim 9, wherein the confidence calculating unit is configured to calculate the dynamic confidence having a value becoming smaller as a difference between a minimum divergence that is a minimum value of the calculated divergence and a proximate divergence that is a second minimum value next to the minimum divergence of the calculated divergence becomes smaller.

11. The information classification system according to claim 9, wherein the confidence calculating unit is configured to calculate the divergence by using Kullback-Leibler divergence (KL divergence) or Jeffrey divergence.

12. An information classification system, comprising:
a classified information storing unit for storing classified information having already been classified into a certain group and group specification information for specifying the group, in association with each other;

a confidence calculating unit for calculating confidence having a value depending on a probability that a group which is specified based on unclassified information as a target to be classified and classified information selected as reference information from among the stored classified information and into which the unclassified information should be classified is a true group;
an unclassified information acquiring unit for acquiring the unclassified information; and
a group specifying unit for, based on the acquired unclassified information and the reference information, specifying a group into which the unclassified information should be classified.

13. An information classification method, comprising:
calculating confidence having a value depending on a probability that a group into which unclassified information as a target to be classified should be classified is a true group, the group being specified based on the unclassified information and based on classified information selected as reference information from among classified information stored in a storage device for storing classified information having already been classified into a certain group and group specification information for specifying the group in association with each other;
with respect to each classified information of the stored classified information, judging whether a first group and a second group match each other, the first group being a group which is specified based on the each classified information as judgment target information and based on classified information selected as a reference information candidate from among the stored classified information and into which the judgment target information should be classified, and the second group being a group specified based on the group specification information stored in association with the judgment target information; and
calculating static confidence as one of the confidence based on a matching number as a number of judgment target information that the first group and the second group match each other.

14. An information classification device, comprising:
a classified information storing unit for storing classified information having already been classified into a certain group and group specification information for specifying the group, in association with each other; and
a confidence calculating unit for calculating confidence having a value depending on a probability that a group which is specified based on unclassified information as a target to be classified and classified information selected as reference information from among the stored classified information and into which the unclassified information should be classified is a true group,
wherein the confidence calculating unit is configured to:
with respect to each classified information of the stored classified information, judge whether a first group and a second group match each other, the first group being a group which is specified based on the each classified information as judgment target information and based on classified information selected as a reference information candidate from among the stored classified information and into which the judgment target information should be classified, and the second group being a group specified based on the group specification information stored in association with the judgment target information; and calculate static confidence as one of the confidence based on a matching number as a number of judgment target information that the first group and the second group match each other.

15. An information classification method, comprising:

calculating confidence having a value depending on a probability that a group into which unclassified information as a target to be classified should be classified is a true group, the group being specified based on the unclassified information and based on classified information selected as reference information from among classified information stored in a storage device for storing classified information having already been classified into a certain group and group specification information for specifying the group in association with each other;

with respect to each group specification information of group specification information different from each other among the stored group specification information, calculating a divergence representing a degree of divergence between the reference information selected for the each group specification information and the unclassified information; and calculating dynamic confidence as one of the confidence based on the calculated divergence.

16. An information classification device, comprising:

a classified information storing unit for storing classified information having already been classified into a certain group and group specification information for specifying the group, in association with each other; and a confidence calculating unit for calculating confidence having a value depending on a probability that a group which is specified based on unclassified information as a target to be classified and classified information selected as reference information from among the stored classified information and into which the unclassified information should be classified is a true group, wherein the confidence calculating unit is configured to:

with respect to each group specification information of group specification information different from each other among the stored group specification information, calculate a divergence representing a degree of divergence between the reference information selected for the each group specification information and the unclassified information; and calculate dynamic confidence as one of the confidence based on the calculated divergence.

17. An information classification method, comprising:

calculating confidence having a value depending on a probability that a group into which unclassified information as a target to be classified should be classified is a true group, the group being specified based on the unclassified information and based on classified information selected as reference information from among classified information stored in a storage device for storing classified information having already been classified into a certain group and group specification information for specifying the group in association with each other;

acquiring the unclassified information; and based on the acquired unclassified information and the reference information, specifying a group into which the unclassified information should be classified.

18. An information classification device, comprising:

a classified information storing unit for storing classified information having already been classified into a certain group and group specification information for specifying the group, in association with each other;

a confidence calculating unit for calculating confidence having a value depending on a probability that a group which is specified based on unclassified information as a target to be classified and classified information selected as reference information from among the stored classified information and into which the unclassified information should be classified is a true group;

an unclassified information acquiring unit for acquiring the unclassified information; and a group specifying unit for, based on the acquired unclassified information and the reference information, specifying a group into which the unclassified information should be classified.

* * * * *